April 23, 1957 R. MILLERSHIP 2,790,160

STORAGE SYSTEMS FOR ELECTRONIC DIGITAL COMPUTING APPARATUS

Filed Aug. 9, 1952 3 Sheets-Sheet 1

INVENTOR
RONALD MILLERSHIP
BY
Baily, Stephens & Huettig
ATTORNEY

April 23, 1957 R. MILLERSHIP 2,790,160

STORAGE SYSTEMS FOR ELECTRONIC DIGITAL COMPUTING APPARATUS

Filed Aug. 9, 1952 3 Sheets-Sheet 2

INVENTOR
RONALD MILLERSHIP

BY
Bailey, Stephens & Huettig
ATTORNEY

April 23, 1957 R. MILLERSHIP 2,790,160

STORAGE SYSTEMS FOR ELECTRONIC DIGITAL COMPUTING APPARATUS

Filed Aug. 9, 1952 3 Sheets-Sheet 3

INVENTOR
RONALD MILLERSHIP
BY
Bailey, Stephens & Huettig
ATTORNEY

United States Patent Office 2,790,160
Patented Apr. 23, 1957

2,790,160

STORAGE SYSTEMS FOR ELECTRONIC DIGITAL COMPUTING APPARATUS

Ronald Millership, Stanmore, England

Application August 9, 1952, Serial No. 303,552

Claims priority, application Great Britain August 9, 1951

3 Claims. (Cl. 340—174)

This invention relates to storage systems for electronic digital computing apparatus in which information is represented by binary numbers and these are in turn represented by trains of voltage pulses, generally in such a manner that the presence of a pulse at a given digit position indicates binary 1 in that digit position and the absence of a pulse at a given digit position indicates binary 0 in that position.

It is frequently desirable that such computing apparatus shall be furnished with a "memory," i. e. means whereby digital information may be stored until required and then read out as many times as may be necessary without destroying the stored information.

Various proposals have already been made to this end but they have generally involved continuous circulation of the stored information or continual "re-writing" of the information into the store and hence have required relatively complicated or somewhat fragile apparatus.

It is the object of the present invention to provide improved storage systems of a static character for computing apparatus of the nature indicated, which storage systems shall be relatively simple and robust.

According to the invention, a storage system for digital computing apparatus is characterised in that the information is stored as remanent magnetisation of a material having an appreciable magnetostriction and is read out when required by causing an acoustic pulse to travel through the material.

The basic principles underlying the invention and the manner in which the latter may be carried into practical effect will be understood from the following more detailed description taken with reference to the accompanying drawings, in which.

Figures 1, 2, 3, 4, 5:
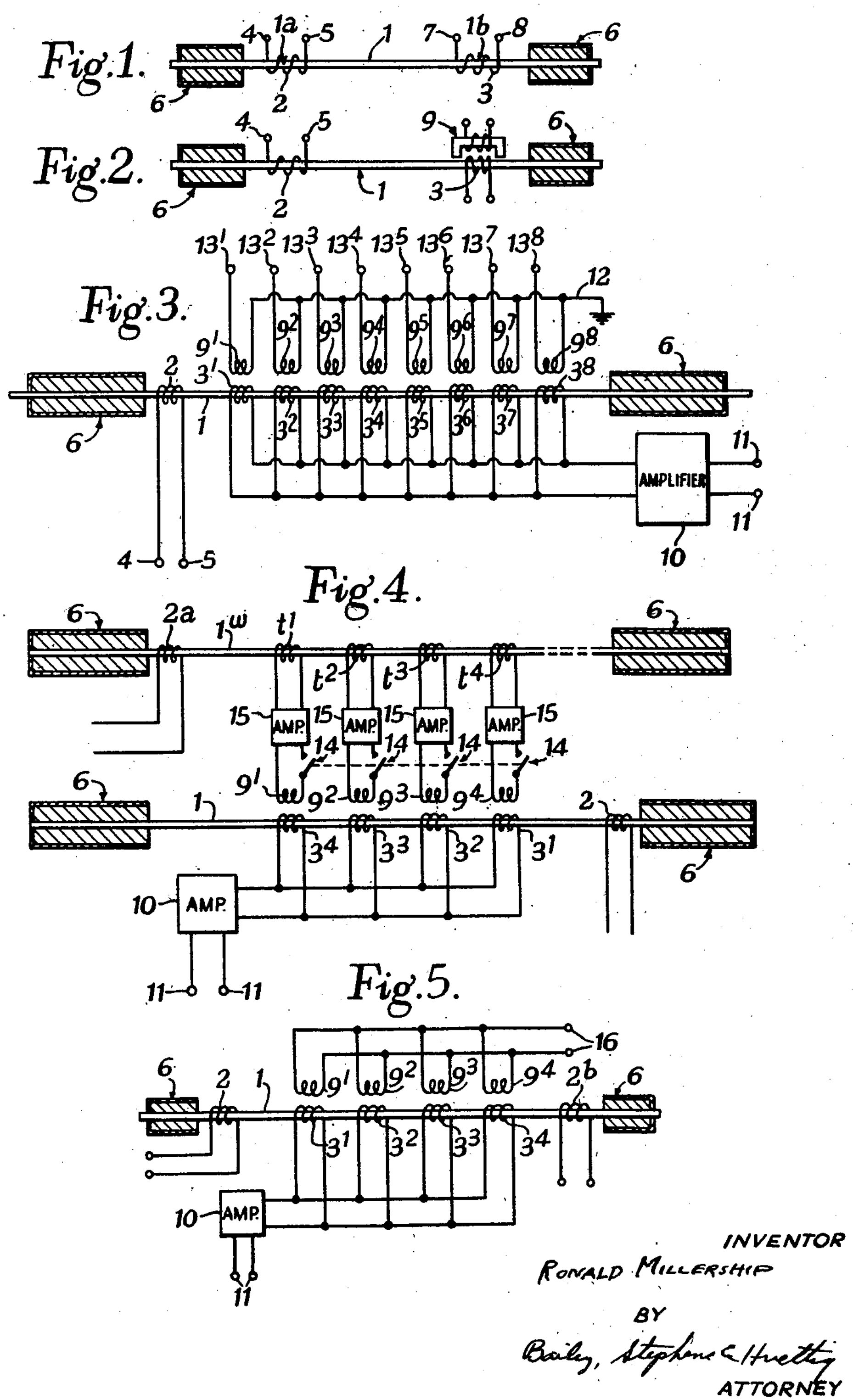
Fig. 1 is a diagram illustrating the description of the basic principles.
Fig. 2 is a similar diagram showing two different forms of magnetising devices.
Fig. 3 is a diagram showing a simple storage system according to the invention.
Figs. 4 and 5 are diagrams illustrating two alternative methods of writing the required information into the storage line.

Referring firstly to Figs. 1 and 2, when a piece of a ferro-magnetic material which exhibits appreciable magnetostriction, e. g. nickel, which piece is long in relation to its cross-section, for example, a wire, tube or tape 1 of said material, is coupled electro-magnetically to two coils 2 and 3 disposed at opposite ends of the length of material, it is possible to use the latter as a delay device. For case of reference, the piece of material will be termed a "wire," the coil 2 at one end of the wire 1 will be termed the "transmitting coil," and the coil 3 at the other end of the wire will be termed the "output coil." When an input pulse of electric current is supplied at the terminals 4, 5 of the transmitting coil 2 from a suitable external source, it causes a change in the magnetisation of the part 1*a* of the wire threaded through it and thus, because of magnetostriction, a change in length of that portion of the wire during the period for which current flows in the coil. The temporary change in length in this portion 1*a* of the wire sets up two acoustic pulses which are propagated through the wire 1 in both directions, i. e. one towards each end of the wire, with a velocity determined mainly by the elasticity and density of the material of the wire. By providing suitable supports 6 for the wire 1 at its extremities, for example, sleeves packed with petroleum jelly which is in contact with the wire, it is ensured that the acoustic pulses are not reflected at the ends of the wire so that, for one pulse of current in the transmitting coil 2, only one acoustic pulse will travel along the wire to the output coil 3. As the acoustic pulse passes along the portion 1*b* of the wire 1 threaded through the output coil 3, the dimensions of this portion 1*b* of the wire will change and, in general, the magnetisation of that portion of the wire will change also. Any changes of magnetisation which occur as the acoustic pulse passes along the portion 1*b* of the wire disposed within the output coil 3 will generate E. M. F.'s in this coil so that a voltage pulse will appear across the terminals 7, 8 thereof. The time delay between input and output pulses is determined by the time taken for the acoustic pulse to travel along the wire 1 between the transmitting and output coils and may be varied by changing the degree of separation of these coils.

The nature of the output from the output coil 3 is, however, dependent on the state of magnetisation of the portion 1*b* of the wire immediately prior to the passage of the acoustic pulse, the magnitude and sign of the output being determined by the magnitude and sign of the magnetisation in the wire as well as by the nature of the pulse along the same. Thus if the current pulses applied to the transmitting coil 2 are always of the same sign, a positive, negative or zero output can be obtained from the output coil 3, as desired, by suitably arranging the magnetisation of the part 1*b* of the wire within this latter coil. This magnetisation need not necessarily be produced by an externally applied field but may also be remanent magnetisation in the material.

Because the output from the output coil 3 depends upon the state of magnetisation of the part 1*b* of the wire disposed within the same, digital information may be stored as remanent magnetisation. In the simplest form of the invention, the digital information is used to magnetise the portion of the wire 1*b* threading the output coil 3, for example, by passing a current pulse through the latter, and the state of magnetisation produced in that portion of the wire may then be determined by passing a current pulse through the transmission coil 2 and observing the signal produced at the terminals 7, 8 of the output coil 3. In other words the information stored in the portion 1*b* of the wire threading the output coil 3 is read out on the latter by the application of a single pulse to the transmission coil 2. It should be noted that the operation of reading does not destroy the stored information. Thus, informtion may be written into the wire 1 by passing a writing pulse through the output coil 3 after which the portion 1*b* of the wire at this point will be magnetised in a given sense. Each time that an acoustic pulse passes through this portion 1*b* of the wire a voltage pulse will be produced at the terminals 7, 8 of the output coil 3. When no longer required, the stored information may be erased from the portion 1*b* of the wire by the application thereto of a field which, on removal, will leave the material of that portion of the wire almost unmagnetised. This field may be established by passing a suitable current through the coil 3, or through a separate coil (not shown) wound over the same, or by any other suitable known means.

Any method of producing a magnetic field may be used to write information into the wire. The method described above is that of passing a current through a coil surrounding the wire but alternative means include a small electro-magnet 9 (Fig. 2) so disposed that the wire 1 is located in the air gap thereof, or the passage of current through the wire 1 itself. This last method may be arranged to affect the whole length of the wire whereas the other methods described affect only the small portion thereof (such as *1b*) which is threaded through the output coil 3 or located in the gap of the magnet 9. In order to simplify the switching arrangements, more than one magnetising device may be used at each digit position, as shown in Fig. 2 (see magnet 9 and the coil 3). The effects of the several devices may be arranged to be additive.

A simple system which will suffice for the storage of a single "word" will now be described with reference to Fig. 3. By a "word" is meant a piece of information which can be represented by a binary number translated into a train of voltage pulses. The apparatus consists of a length of nickel wire 1 which has an input or transmitting coil 2 wound around one end and which is threaded along its length through each of a series of eight output coils $3^1$, $3^2$, $3^3$, . . . $3^8$, respectively corresponding to the eight digit positions of the word to be stored. The spacing of the output coils $3^1$ . . . $3^8$ is such that the time required for an acoustic pulse to travel through the wire 1 from one (say, $3^1$) to the next (say, $3^2$) is equal to the required time between digits of the word. At each location where an output coil is disposed there is also provided writing means which may, for example, be small electro-magnets $9^1$ . . . $9^8$ corresponding to that shown at 9 in Fig. 2 but represented by their windings only. The output coils are connected in series or parallel, or some combination thereof, to a common output. As shown, they are connected in parallel across the input to a conventional amplifier, represented by the block 10, having output terminals 11. The windings of the writing electro-magnets are all connected at their one ends to a common earth lead 12 and at their other ends to respective input terminals $13^1$ . . . $13^8$. Initially, the wire 1 threading the respective output coils is unmagnetised so that when a reading current pulse is passed through the transmitting coil 2, zero output is obtained at the common output 11, 11 referred to. The digits of the word to be stored are imposed on the magnetising windings $9^1$ . . . $9^8$, binary digit 1 being represented by a positive current pulse and binary digit 0 by no pulse. It will be understood, however, that these two digits can alternatively be represented by pulses of opposite sign. The first, or least significant digit in the word is fed to the magnetising coil $9^1$ which is disposed nearest to the transmission coil 2, the second to the next adjacent coil $9^2$, and so on, and the wire 1 threading the output coils will now be magnetised in one sense over those lengths disposed within those coils, which are to store a binary digit 1 whereas those lengths of the wire disposed within the output coils which are to store the binary digit 0 will remain unmagnetised.

Should a reading pulse of current now be imposed on the transmitting coil 2, there will be produced an acoustic pulse which will travel along the wire 1 in the direction of the coils $3^1$ . . . $3^8$. When this pulse arrives at the first output coil $3^1$, a voltage pulse will be produced in this coil corresponding to the digit stored at that location. The acoustic pulse will continue along the wire to the second output coil $3^2$, arriving one digit time later and again producing the appropriate output. An output corresponding to the digit stored at the respective location will be obtained from each output coil so that the entire word stored will be obtained in serial form in the common output circuit 11, 11. The word may be read out any number of times and will remain stored in the wire indefinitely.

When it is required to cancel the stored word, a cancellation pulse is passed through the magnetising windings $9^1$ . . . $9^8$ so as to return the wire to the unmagnetised condition.

The word to be stored will normally be available in serial form and, in order that it may be utilised as described above, the digits thereof must be made available separately for feeding to the respective magnetising windings.

This may be achieved as shown in Fig. 4 by employing a second wire 1*w* in order to simplify the required switching. This second wire 1*w* will be referred to as the "writing" line and has at its one end a coil 2*a* adapted to serve as a transmitting coil but now referred to, for the sake of clarity, as a "number input" coil. At appropriate spacings along the writing line 1*w* there are disposed a plurality of coils $t^1$, $t^2$, $t^3$ and $t^4$ spaced apart by distances corresponding to digit times in the word to be stored. These coils $t^1$ to $t^4$ will be referred to as "transter" coils. The wire 1*w* constituting the writing line is uniformly magnetised throughout its length in an appropriate sense. The wire 1 constituting the storage line has at its one end a transmission coil 2 and, at appropriate digit time spacings, a number of writing coils $9^1$, $9^2$, $9^3$ and $9^4$ (each corresponding to a coil in the series $9^1$ . . . $9^8$ of Fig. 3) which are adapted to be connected each to one of the transfer coils $t^1$ to $t^4$ and on the writing line 1*w* through a switch 14 and an appropriate amplifying means 15. The coils are all so connected simultaneously upon ganged operation of the switches 14, the connections being such that the transfer coil $t^4$ on the writing line 1*w* which is farthest removed from the number input coil 2*a* will be switched to the magnetising winding $9^4$ on the storage line 1 which is nearest to the transmitting coil 2 thereon, the transfer coil $t^3$ next farthest from the number input coil 2*a* is similarly connected to the magnetising coil $9^3$ which is next nearest to the transmitting coil 2 and so on throughout the whole series of transfer and magnetising coils. The word to be stored is supplied to the number input coil 2*a* of the writing line 1*w* as a train of voltage pulses which will generate the appropriate train of acoustic pulses in the line. This line as well as the line 1 is terminated in clamps 6 for preventing reflection of the acoustic pulses at the ends of the lines. A period of time is allowed to elapse during which the train of acoustic pulses travels down the writing line 1*w* until that pulse corresponding to the first, or least significant, digit of the word is about to enter the section of the wire 1*w* located in the transfer coil $t^4$ most remote from the number input coil 2*a*, the succeeding pulses corresponding to the following digits of the word then each being about to enter the sections of the wire threading the appropriate transfer coils $t^3$, $t^2$ and $t^1$. Thereupon all these transfer coils $t^1$ to $t^4$ are switched to the magnetising coils $9^1$ to $9^4$ on the storage line 1 by closing the switches 14 for an interval of time corresponding to one digit time in the word to be stored. As will be appreciated, the required word is then written in on the storage line 1. It may be read off from the latter, in the manner already described above with reference to Fig. 3, by sending a sampling pulse through the transmission coil 2 on the storage line 1, which also carries at each digit position an output coil $3^1$, $3^2$, $3^3$ or $3^4$, whereupon the required word, in the form of a train of voltage pulses, will be supplied by way of an amplifier 10, to a common output 11, 11.

In another arrangement illustrated in Fig. 5 the wire employed being composed of a magnetic material having suitable properties, use is made of the fact that unless the magnetising field acting upon this material exceeds a certain critical value, it will have no effect on the remanent magnetisation in the wire. In this system a single wire 1 is employed to constitute a storage line, with a transmitting coil 2 at one end thereof and a series of output coils $3^1$, $3^2$, $3^3$ and $3^4$ spaced along the wire in the appropriate manner so that each corresponds to a digit position in the word to be stored. At the location of each coil $3^1$ to $3^4$ there is also provided a magnetising coil $9^1$ to $9^4$, respectively, these coils being connected in parallel across terminals 16. The word to be stored is supplied, as a train of electrical pulses, into the transmitting coil 2 of the storage line and when the resulting acoustic pulses are so situated along the storage line 1 that each pulse representing a given digit is about to enter the section of the line associated with the respective output coil $3^1$ to $3^4$ in the corresponding digit position, a current pulse is supplied at the terminals 16 and passed through all the magnetising coils $9^1$ to $9^4$ at the same instant. Should an acoustic pulse corresponding to a digit value 1 be at any one coil $3^1$, $3^2$, $3^3$, or $3^4$, then the magnetic flux due to the strain produced by the acoustic pulse and that due to the current in the magnetising coil $9^1$, $9^2$, $9^3$ or $9^4$, concerned will together be sufficient to leave positive remanent magnetisation in the wire. However, the field due to the current alone is not sufficient to change the existing state of magnetisation permanently so that if there is no acoustic pulse at any particular coil (corresponding to digit 0) no remanent magnetisation will be produced. In this case, the reading coil **2*b* must be at that end of the storage line 1 farthest from the transmission coil 2 so that when supplied with the sampling pulse required to effect reading off of the stored information, the digits of the latter will appear in the correct order of significance at the output 11**.

Figure 6:
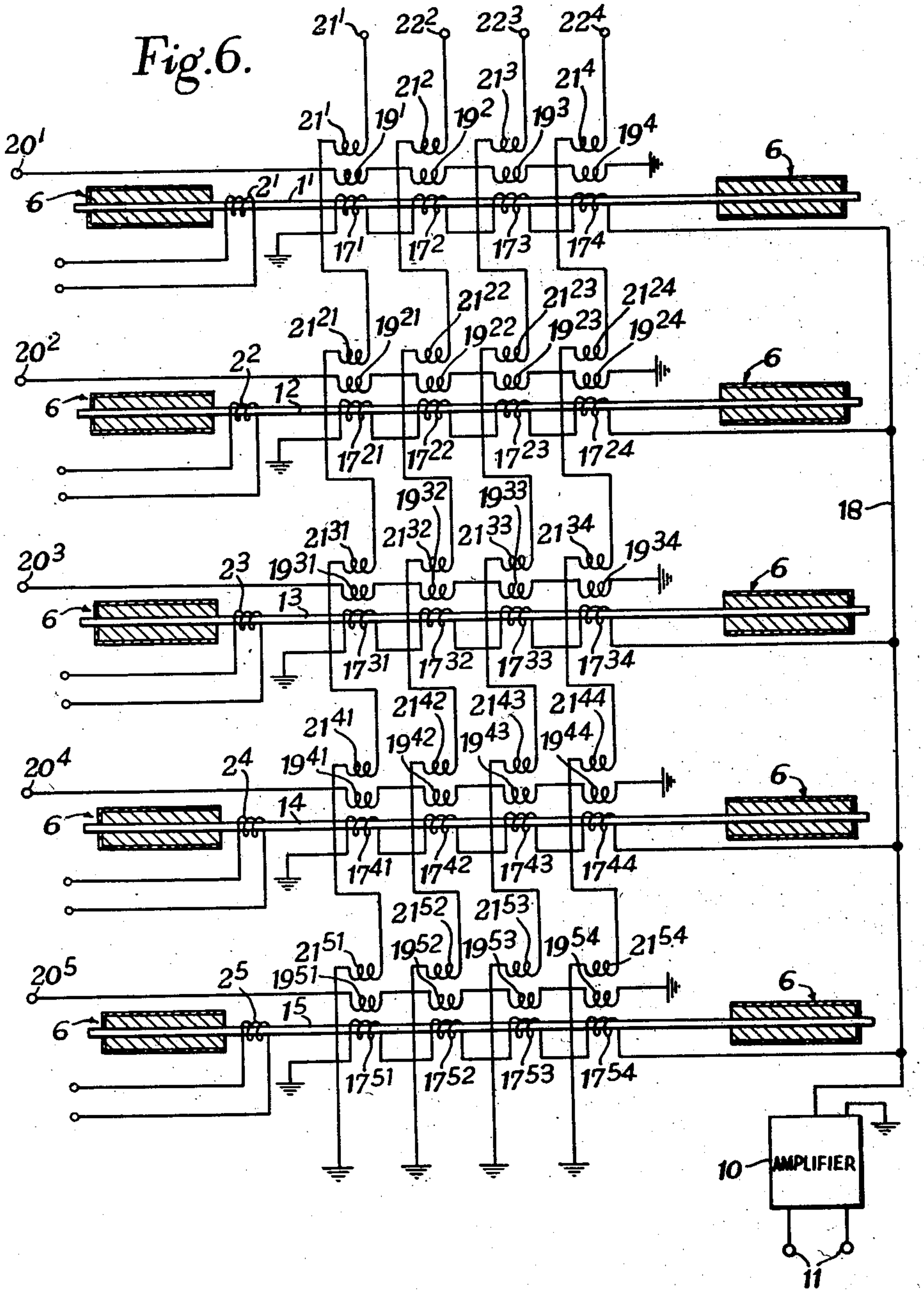
Fig. 6 is a diagram showing a "two-dimensional" storage system.

In order to store a large number of digits with a small number of switching lines, a number of magnetostriction lines may be used together as shown in Fig. 6. In this system, advantage is taken of the fact that the effect of different magnetising devices may be made additive and that with certain magnetic materials a certain critical field is required to change the remanent magnetisation. In the arrangement of this character illustrated, there are a number of storage lines $1^1$, $1^2$, $1^3$, $1^4$ and $1^5$ arranged in parallel between respective end clamps 6. At each of a number of positions spaced at digit intervals along each line there are located three coils which may be wound on a common former, or otherwise arranged, so that each one of the three is electro-magnetically coupled with the same portion of the length of the storage line concerned. Two of the coils of each set of three constitute a pair of magnetising devices for the line in question and the third coil is an output coil. The output coils on a given line $1^1$, $1^2$ or $1^5$ are marked $17^1$ to $17^4$, $17^{21}$ to $17^{24}$ . . . $17^{51}$ to $17^{54}$, respectively and are connected in series between earth and a common input 18 to an amplifier 10 having output terminals 11. The one magnetising device of each pair associated with the storage line $1^1$, is marked $19^1$, $19^2$, $19^3$ or $19^4$, respectively, and these devices are electrically connected in a "horizontal" series between earth and an input terminal $20^1$. The corresponding horizontal series of magnetising devices for the lines $1^2$ to $1^5$ are marked $19^{21}$ to $19^{24}$, $19^{31}$ to $19^{34}$, . . . and $19^{51}$ to $19^{54}$, respectively. The corresponding input terminals are marked $20^2$ to $20^5$, respectively.

The other magnetising devices of the several pairs are arranged to constitute what may be termed "transverse" series of such devices, each of these latter series comprising a device from each location of the one set of corresponding locations on all the lines. The devices in the first transverse series are marked $21^1$, $21^{21}$, $21^{31}$, $21^{41}$ and $21^{51}$, respectively, and are electrically connected in series between earth and an input terminal $22^1$. The subsequent transverse series of magnetising devices are marked $21^2$, $21^{22}$ . . . $21^{52}$; $21^3$, $21^{23}$, . . . $21^{53}$; and $21^4$, $21^{24}$, . . . $21^{54}$, respectively, and the corresponding input terminals are marked $22^2$, $22^3$ and $22^4$, respectively.

It will be assumed that a field of a given strength 2H is required to magnetise any one of the wires $1^1$ to $1^5$ at a digit position to such an extent that the remanent magnetisation at that position when the field is removed will cause an output to be produced in the corresponding output coil, $17^1$, or $17^2$ . . . or $17^{54}$, when an acoustic reading pulse is caused to travel along the wire by supplying an electric pulse to the appropriate transmission coil $2^1$, $2^2$, $2^3$, $2^4$ or $2^5$, whereas a field of half this value, namely H, will be insufficient to produce the requisite degree of magnetisation. A current of a certain value is arranged to be supplied at will to selected ones of the input terminals $20^1$ to $20^5$ and $22^1$ to $22^4$, this current producing a field of strength H in the wires at all the digit positions corresponding to the magnetising devices in the series (whether horizontal or transverse) which is concerned. Consequently, it is only when such a current is supplied to the input terminals supplying the magnetising device (such as $19^1$) in a horizontal series (such as $19^1$ to $19^4$) and the magnetising device (such as $21^1$) in a transverse series (such as $21^1$ to $21^{51}$) which together constitute the pair at a given location, that the portion of the wire (such as that in the least significant digit position on wire $1^1$) in the digit position at that location will be magnetised sufficiently to give an output for a corresponding reading pulse when this is subsequently supplied to the appropriate transmission coil (such as $2^1$). At all the other digit positions along the two series of magnetising devices concerned the field strength produced will only be H and therefore the portions of the wires at these digit positions will not be magnetised sufficiently to produce an output when an acoustic reading pulse is transmitted subsequently along the storage lines concerned. In this manner a digit may be stored in any position uniquely.

In the arrangement just referred to, a word may be stored by supplying a current of the given value to each of the appropriately selected terminals from the group $22^1$ to $22^4$ and then supplying a similar current to a selected terminal of the group $20^1$ to $20^5$ to "write" the word into the corresponding storage line of the group $1^1$ to $1^5$. The word may be read out at the terminals 11 as a train of voltage pulses by supplying a reading electric pulse to the transmission coil associated with the required storage line.

A digit position may also be specified uniquely with two reading pulses by having magnetostrictive lines in the transverse rows also, each output coil $17^1$ to $17^{54}$ being threaded by two magnetostrictive lines at right angles. An output coil located at the intersection of two lines along each of which a reading pulse is transmitted will then give a greater output than a coil located at the intersection of two lines along only one of which a reading pulse travels. In a strictly analogous manner, a three dimensional stack of lines may be built up in which each digit position on a storage line is electro-magnetically coupled to three magnetising devices each of which is included in a separate series of such devices, the three series of magnetising devices being arranged mutually at right angles to each other. In this case, only approximately one-third of the total magnetising field required to magnetise the magnetostrictive material at a digit position is produced by the current supplied to each series of magnetising devices.

Figure 7:
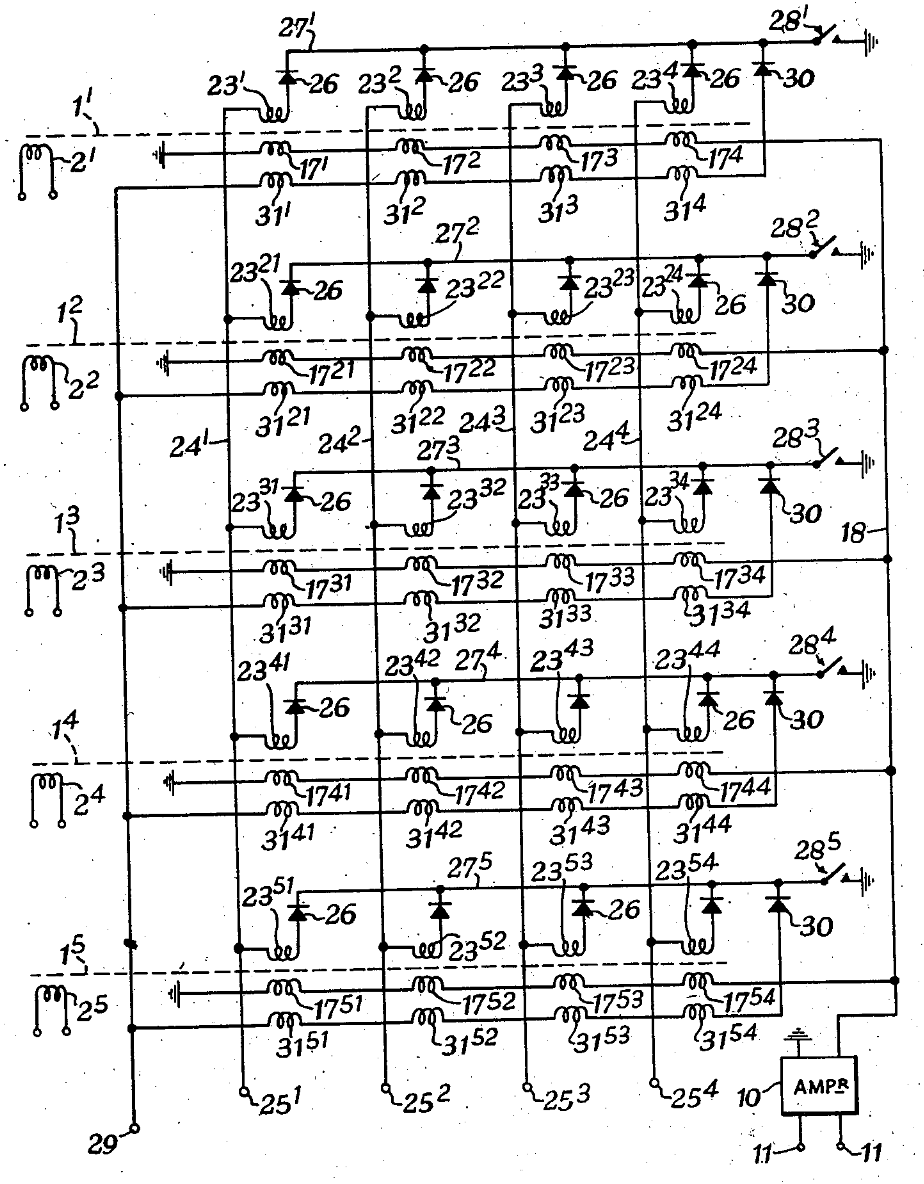
Fig. 7 is a diagram illustrating a stacked array of storage lines.

Fig. 7 illustrates another arrangement according to the invention in which there are five storage lines $1^1$ to $1^5$, represented here by broken lines for the sake of clarity in the drawing, each composed of a nickel wire held at its extremities in reflection-preventing end clamps. That portion of each wire located at a digit position is coupled electro-magnetically to three coils, one of which is an output coil, another of which is a magnetising coil and the third of which is a de-magnetising coil or cancelling coil. The output coils associated with any given line of the group $1^1$ to $1^5$ are all connected electrically in series between earth and a common input 18 to an amplifier 10 having output terminals 11. The output coils for line $1^1$ are marked $17^1$ to $17^4$, those for line $1^2$ are marked $17^{21}$ to $17^{24}$, and so on as in the case of Fig. 6. The magnetising coils associated with the line $1^1$ are marked $23^1$ to $23^4$ and those associated with the lines $1^2$ to $1^5$ are marked, respectively, $23^{21}$ to $23^{24}$, $23^{31}$ to $23^{34}$, $23^{41}$ to $23^{44}$ and $23^{51}$ to $23^{54}$. All the magnetising coils located at the least significant digit positions of the lines $1^1$ to $1^5$ are connected at one end to a common lead $24^1$ terminating at an input terminal $25^1$ but have their other ends connected through respective uni-directional conducting devices 26 to the corresponding conductors $27^1$, $27^2$, $27^3$, $27^4$ and $27^5$. Similarly, the coils at the next least significant digit positions (i. e. $23^2$, $23^{22}$, $23^{32}$, $23^{42}$ and $23^{52}$) are connected at one end to a common lead $24^2$ terminating at input terminal $25^2$ and at the other end to the respective conductors $27^1$ to $27^5$ through uni-directional conducting devices 26. The other magnetising coils are connected in the same sense between the respective lead $24^3$ or $24^4$ (with terminal $25^3$ or $25^4$) and conductors $27^1$ to $27^5$, as shown. Each of the conductors $27^1$ to $27^5$ is arranged to be connected to earth when required by closing the respective switch of the series $28^1$ to $28^5$.

All the de-magnetising coils associated with a given line of the group $1^1$ to $1^5$ are connected in series between a common input terminal 29 and one side of a respective uni-directional conducting device 30 the other side of which is connected to the respective one of the conductors $27^1$ to $27^5$. These coils are marked $31^1$ to $31^4$ for line $1^1$, $31^{21}$ to $31^{24}$ for line $1^2$, and so on.

Also associated with each of the lines $1^1$ to $1^5$ is a transmission coil $2^1$, $2^2$, $2^3$, $2^4$ or $2^5$, respectively.

With this arrangement, the line on which a word is to be stored is first selected by closing the appropriate switch of the series $28^1$ to $28^5$. Each of the terminals $25^1$ to $25^4$ which corresponds to a digit position at which the digit 1 is to appear in the word in question is then supplied with a current of such a value that the selected magnetising coils will magnetise the portions of the required line which are electro-magnetically coupled thereto sufficiently to ensure that the remanent magnetisation of each such portion (after the supply of current is cut off) will produce an electric pulse in the associated output coil upon the passage of an acoustic pulse along the selected line.

Reading out of one of the stored words is effected by supplying a reading pulse of electric current to the required transmission coil $2^1$, . . . or $2^5$, whereupon an acoustic pulse is caused to travel along the corresponding line of the group $1^1$ to $1^5$ and produce in the appropriate output coils electric pulses which appear in serial form at the input 18 of the amplifier 10.

When it is desired to cancel the information stored in any given line of the group $1^1$ to $1^5$, the appropriate switch of the series $28^1$ to $28^5$ is closed and a cancellation pulse of electric current is supplied at the terminal 29. In consequence, a field is applied to the portions of the selected line located at the digit positions which is such that upon its removal these portions of the line will be almost completely unmagnetised. Should an acoustic pulse now be transmitted along the line in question no appreciable output will be obtained from the output coils associated with that line. Another word may then be written into the line in question, by the method described above, if desired.

It will be appreciated that the presence of the uni-directional conducting devices 26 and 30 ensures that all the writing and cancellation circuits are effectively isolated from each other so that undesired effects cannot be produced.

It will be appreciated also that the storage systems according to this invention enable information to be stored as remanent magnetisation of the material of a magnetostriction line from which the information may be read out subsequently by passing an acoustic pulse along the line. It will be seen, therefore, that the storage system is static and that the apparatus required is relatively simple and can be constructed in a robust fashion.

What I claim is:

1. Apparatus for storing a plurality of items of digital information each of which is capable of being represented by a train of voltage pulses, comprising a plurality of magnetostrictive delay lines corresponding in number to the maximum number of items of information to be stored, each of said lines being sub-divided into a plurality of zones corresponding in number to the number of possible pulse positions in each of said trains and spaced apart along said line by a distance corresponding to the product of the velocity of an acoustic pulse in said line and the time between successive possible pulse positions in each of said trains, a non-reflecting termination supporting each end of each of said lines, a plurality of series of magnetising devices corresponding in number to the number of delay lines, each series being associated with a corresponding delay line and being constituted by a plurality of serially connected magnetising devices corresponding in number to the number of zones in the associated delay line and arranged with each magnetising device of a series associated with a zone of the corresponding delay line to modify the magnetisation of the zones of the associated line upon the passage of an electric signal through the corresponding series of magnetising devices, a plurality of further series of magnetising devices corresponding in number to the number of zones in each delay line, each further series being associated with all the delay lines and being constituted by a plurality of serially connected magnetising devices corresponding in number to the number of delay lines and arranged with each magnetising device of each of said further series associated with a corresponding zone in each of said delay lines to further modify the magnetisation of the zones in each line associated with a corresponding one of said further series upon the passage of an electric signal through the magnetising devices of said one further series, means for passing an electric signal through a selected one of said series of magnetising devices to modify the magnetisation of the zones of the delay line associated with said selected one series, means for passing an electric signal through a selected one of said further series to further modify the magnetisation of that zone of that delay line associated with said selected one series which is associated both with a magnetising device of said selected one series and with a magnetising device of said selected one further series, means for injecting an acoustic pulse into any one of said delay lines, and a plurality of series of output devices corresponding in number to the number of delay lines, each series being associated with a delay line and each comprising a plurality of output devices corresponding in number to the number of zones in the associated delay line, each output device of a series being associated with a corresponding zone of the associated delay line and being responsive to the passage of an acoustic pulse through the associated zone when the magnetisation of the latter is modified by the associated magnetising devices of both the series and the further series of such devices to produce a voltage output representative of the information stored in that zone.

2. Apparatus according to claim 1 wherein the magnetising devices of the said series and the said further series of such devices each comprise a coil electromagnetically coupled with the associated zone.

3. Apparatus according to claim 1 wherein the output devices of each series each comprise a coil electromagnetically coupled with the associated zone, the coils of each series being connected serially to provide an output train of voltage pulses corresponding to the information stored in the delay line associated with the series of output devices upon the passage of an acoustic pulse through the associated delay line.

References Cited in the file of this patent

UNITED STATES PATENTS

| | | |
|---|---|---|
| 2,495,740 | Labin | Jan. 31, 1950 |
| 2,552,139 | Bocciarelli | May 8, 1951 |
| 2,612,603 | Nicholson | Sept. 30, 1952 |
| 2,736,881 | Booth | Feb. 28, 1956 |

OTHER REFERENCES

Magnetostrictive Delay Line, Bradburd, Electrical Communication, March 1951, vol. 28, No. 1, pages 46 to 53.